Sept. 15, 1964   R. R. NEWTON   3,148,846
SYSTEM FOR GRAVITY ORIENTING A SATELLITE
Filed Jan. 7, 1963   2 Sheets-Sheet 2

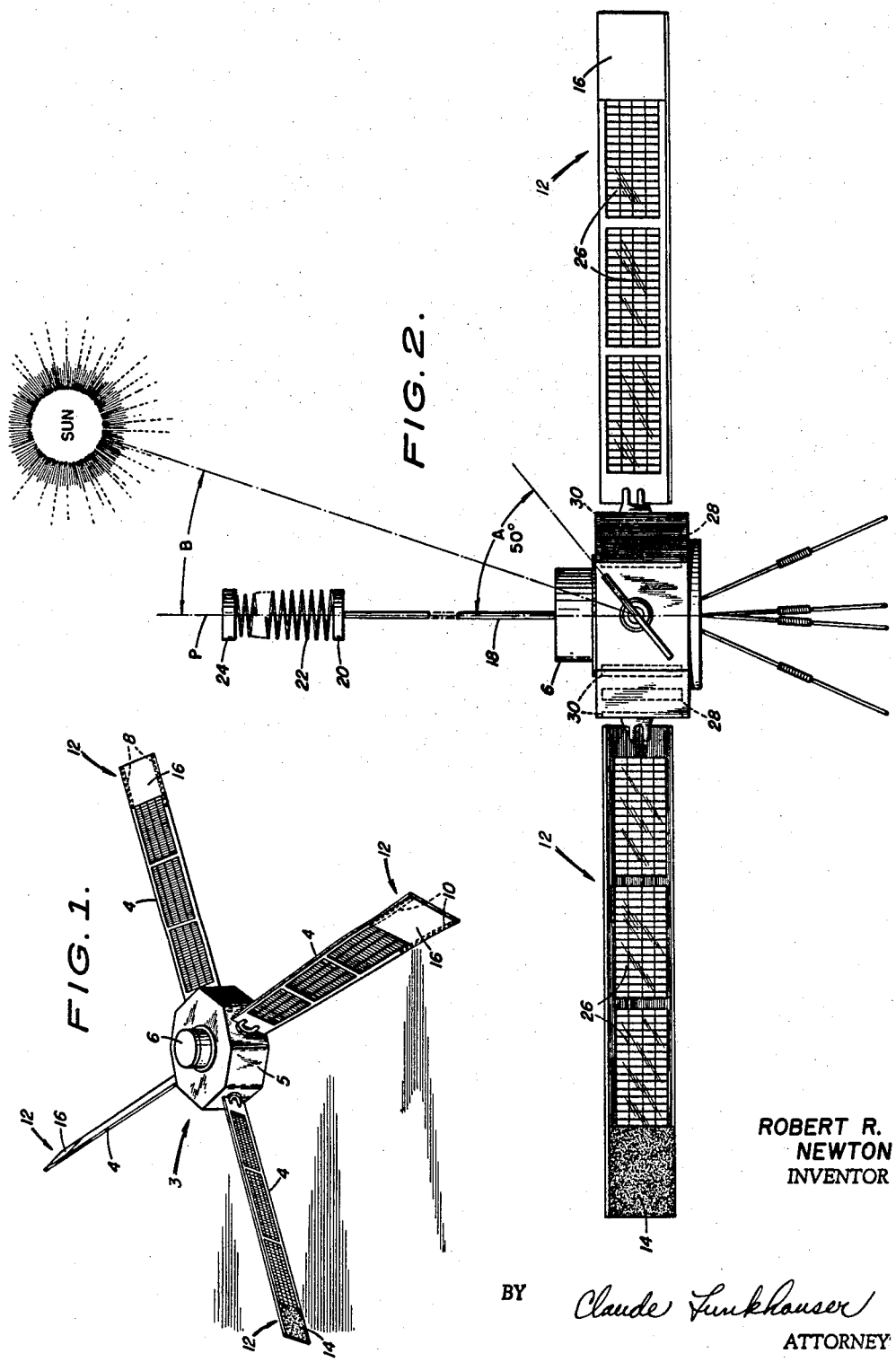

ROBERT R. NEWTON
INVENTOR

BY Claude Funkhouser
ATTORNEY

3,148,846
SYSTEM FOR GRAVITY ORIENTING A SATELLITE
Robert R. Newton, Silver Spring, Md., assignor to the United States of America as represented by the Secretary of the Navy
Filed Jan. 7, 1963, Ser. No. 249,961
6 Claims. (Cl. 244—1)

This invention relates to attitude control systems and, more particularly, to a gravity gradient stabilization system using a spring for damping out librations about the stabilized axis.

A gravity stabilized satellite permits the use of directional antennas on the satellite, and also allows more enlightened study of phenomena which are sensitive to direction. An important advantage in utilizing a directional antenna in the satellite is that stronger signals would be received at ground stations. For a circular orbit at 500 nautical miles altitude, all ground receiving stations from horizon to horizon could be covered by a satellite whose radio propagation was contained in a cone with a vertex angle of 120 degrees. For this case, a gain of approximately 6 db would be realized over an isotropic radiator. This gain in power received would be a distinct advantage for any navigational weather or communications type satellite.

Another advantage in using a directional antenna in a satellite is that the polarization pattern can be controlled to avoid signal fading produced by Faraday rotation in the ionosphere.

One object of the present invention, therefore, resides in the provision of an attitude control system for an orbiting satellite which will permit the use of directional antennas.

Another object of the invention is to provide an attitude control system which operates to gravitationally stabilize an orbiting satellite.

A further object of the invention is to utilize despin techniques and magnetic orientation to prepare the satellite prior to activation of the gravity gradient attitude control system.

A still further object of the invention is to provide a reliable attitude control system suitable for use in a space environment whereby one side of the satellite is always turned toward the earth.

Another object of the invention is to use a lossy spring to damp out the satellite librations about the stabilized axis.

Other objects and many of the attendant advantages of this invention will be readily appreciated as the same becomes better understood by reference to the following detailed description when considered in connection with the accompanying drawings, wherein:

FIG. 1 is a perspective of a satellite constructed according to the present invention;

FIG. 2 is a side elevation of a satellite utilizing the invention;

Figure 3:
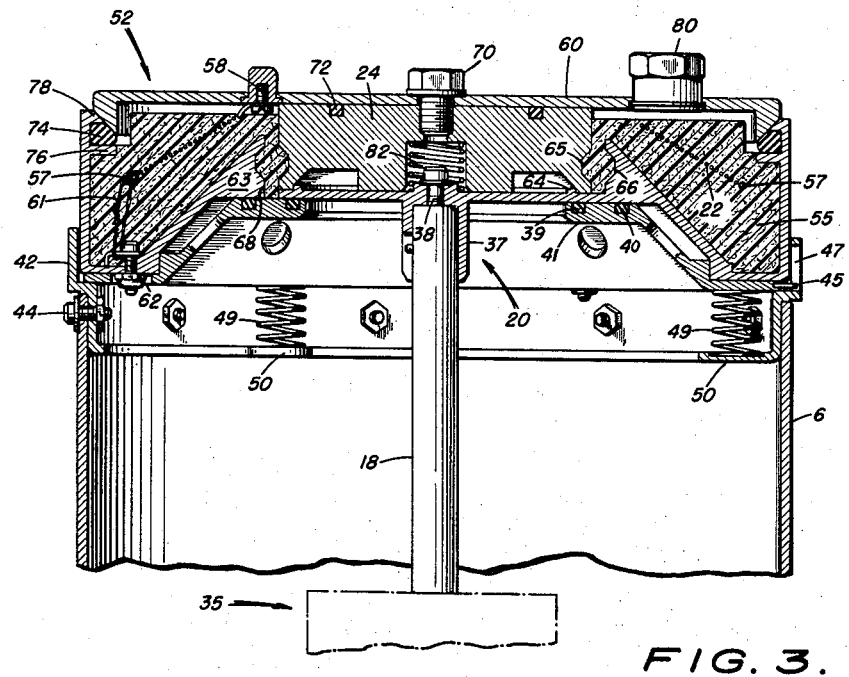
FIG. 3 is a sectional view of the mast, spring and end weight used to practice this invention.

Briefly, the invention contemplates the use of an extensible boom to alter the transverse moment of inertia of a despun, magnetically oriented satellite in orbit, thereby capturing the satellite into a state of libration oscillations; and thereafter using a spring for damping out satellite librations about the gravity stabilized axis.

Gravity orientation requires that the axial moment of inertia be less than the transverse moment, as fully described by R. R. Newton in his article entitled "Method of Stabilizing an Astronomical Satellite," published in the American Rocket Society Journal, October 1959, and by R. E. Fischell in his article entitled "The TRAAC Satellite," published in January-February 1962 issue of the APL Technical Digest. These two articles describe the forces acting upon a satellite and why a dumbbell shaped satellite may become gravitationally oriented.

Additionally, G. M. Schindler in his article entitled "On Satellite Librations," published in the May 1959 issue of the ARC Journal, describes the forces acting on a dumbbell shaped satellite making it oscillate about an attitude of equilibrium somewhat like a pendulum. The present invention utilizes a damping spring to absorb and to dissipate the energy of the oscillations, thereby stopping the oscillations.

In FIG. 1, a satellite 3 is shown having four blades 4 extending outwardly from the sides of the satellite body 5. A boom housing 6, positioned atop the body, contains the mechanism used to gravitationally orient the satellite. A pair of despin rods 8 is located within one blade 4 and a second pair 10 is located within another blade 4 that extends perpendicularly from the line of the first blade. A solar pressure panel 12 is positioned at the end of each blade. Each panel has one side 14 which is painted black, while its other side 16, is painted white.

Referring to FIG. 2, it can be seen that each blade 4 is oriented to lie in a plane that forms a 50 degree angle A with the principal axis P of the satellite body. Although this angle is not critical, it is chosen to ensure that the sense of rotation imparted to the satellite through the operation of the solar pressure panels, is the same regardless of the satellite-sun angle B, that lies between the principal axis of the satellite P and the satellite-sun line.

In FIG. 2 the boom housing 6 is shown with its boom 18 in extended position. A weight 20 is positioned on the outer end of the boom 18 and a librational damping spring 22, with its own weight 24 attached to one end thereof, is connected to the weight 20. A plurality of solar cells 26, mounted on each blade 4, generates electrical energy to charge a plurality of batteries 28 disposed within the body 5. The batteries 28 will furnish the power to operate a plurality of electromagnets 30 which form a part of the magnetic stabilization system, as described by Fischell et al. in their U.S. patent application entitled "Magnetic Satellite System," Serial No. 99,644, filed March 30, 1961, now Patent No. 3,118,637, issued January 21, 1964. For convenience the batteries 28 and magnets 30 are shown schematically and in dotted lines, since they form no part of the present invention.

An extendible boom assembly manufactured by the De Havilland Aircraft of Canada, Ltd., Model No. A16, is shown at 35 in FIG. 3. The boom 18 itself is shown partially extended and attached to a libration spring mount 37 which is constituted by the weight 20 by suitable fastening means 38. The boom 18 holds the mount 37 under tension, thereby compressing a pair of M–R Quad ring seals 39 and 40 positioned in a sealing plate 41, and making an airtight area between the pair of sealing rings. The sealing plate 41 is positioned upon an adapter 42 which is firmly attached to the boom housing 6 by suitable connecting means 44. The sealing plate 41 has a plurality of guide pins 45 attached thereto which extend into suitable slots 47 located in the adapter 42. A plurality of springs 49 have their lower ends resting in recesses within a bottom member 50 of the adapter 42, maintaining the rings 39 and 40 compressed against the mount 37, but primarily required in overcoming the inertia of the spring weight assembly 52 when a boom motor within the assembly 35 is activated. The spring 22 having a plurality of coils, is cast in a block of biphenyl 55. One end of the spring 22 is connected to a forming wire 57, while the other end is connected by suitable means 58 to a cover plate 60. The forming wire is attached to the spring mount 37 by a plurality of nylon loops 61 and attaching means 62. The weight 24 is correctly positioned upon the spring mount 37 by means of an annular keying member 64, and said weight is positioned upon said mount 37 prior to casting the biphenyl. Therefore, a pair of confronting annular grooves 65 and 66, located within the weight 24 and an annular socket 63, respectively, hold the weight to the spring mount until the biphenyl material positioned between the annular grooves sublimes in the space environment through a plurality of ports 68 located in the spring mount 37 and exposed after separation of the sealing plate 41 from said mount 37.

The cover plate 60 is secured to the weight 24 by suitable attaching means 70, thereby deforming an M-R Quad ring 72 positioned within an annular groove in the weight 24, and a larger M-R Quad ring 74 positioned between a pair of annular flanges 76 and 78 which form part of the spring mount 37. The upper annular flange 78 has its inner edge cut at a 45° angle for mating with a corresponding surface on the cover 60.

The ring 72 prevents the biphenyl from subliming into space around the attaching means 70, while the ring 74 prevents the biphenyl from subliming around the cover 60. A pressure valve 80 mounted in the cover 60 releases atmospheric pressure from beneath said cover as the satellite 3 is launched into outer space, preventing a buildup of pressure which might break the seal between the cover and the flange 78. A spring 82 rests upon the spring mount 37 and engages the weight 24.

In operation, the satellite 3 is launched, spinning at a rate of a few revolutions per second. The spinning is stopped by mechanical and magnetic mechanisms described by R. Fischell in his U.S. patent application entitled "Magnetic Despin Mechanism," Serial No. 83,603, filed January 18, 1961, now Patent No. 3,114,518, issued December 17, 1963. The satellite becomes magnetically oriented by means of the invention described by Fischell et al. in their U.S. patent application "Magnetic Satellite Control," Serial No. 99,644, filed March 30, 1961. While the satellite is magnetically oriented, it turns its upper surface, having the boom housing thereon, away from the earth. It is during this period of the satellite's orbit that the boom is extended and the satellite becomes gravity oriented. The magnetic orientation system may then be de-energized. This is accomplished by connecting a large capacitor in parallel with the electromagnets 30, causing a decaying oscillation of the electromagnet current when power is commanded off. However, some magnetic stabilization force will remain in the form of the despin rods for damping out disturbances to the satellite's orientation, caused by collisions with micro-meteorites.

The greatest problem in gravity gradient stabilization is damping out the oscillation of the satellite about the local vertical axis. The damping of this libration motion can be accomplished by means of an ultraweak energy dissipating spring. At the far end of the spring is connected a weight, and the other end of the spring is connected to the end of the boom which may be 60 feet in length. When extended, the damping spring has the shape of the surface of a frustrum of a cone. In its equilibrium position the spring is annealed so as to lie flat. In this latter position the inside diameter of the spring may be 4 inches and the outside diameter of the spring may be 7¼ inches. The spring may consist of 142 turns of 0.007 inch diameter beryllium copper wire. However, beryllium copper by itself does not provide sufficient energy absorption. Therefore, to obtain good damping, a 0.0008 inch thick layer of the mechanically soft material, cadmium, is electrolytically deposited on the outer surface of the beryllium copper wire. Since cadmium tends to sublimate in the hard vacuum of space an additional 0.0002 inch coating of silver is electrolytically deposited on the outer surface of the cadmium to prevent this possibility. When completely fabricated, annealed and coated, the spring may have a constant of 1½ millionths of a pound per foot.

In a gravitational field of 1 g., such a spring is incapable of supporting even one of its turns without exceeding the elastic limit of the material. In order to prevent any tangling of the spring or other damage during handling and launching operations, it is necessary to encapsulate the spring in a solid subliming material. The material selected for this purpose is a compound of the benzine family known as biphenyl. After the spring is formed, it is placed on a conically shaped holder of machined biphenyl and some additional biphenyl is poured on top of it. The biphenyl is also used to securely hold the end weight to the spring mount during the erection of the boom. After the boom is extended the biphenyl sublimes; thereby first reelasing the weight which is then pulled off due to gravity gradient force, and then by gradually subliming around the conically formed spring biphenyl allows the spring to extend one coil at a time.

Figure 4:
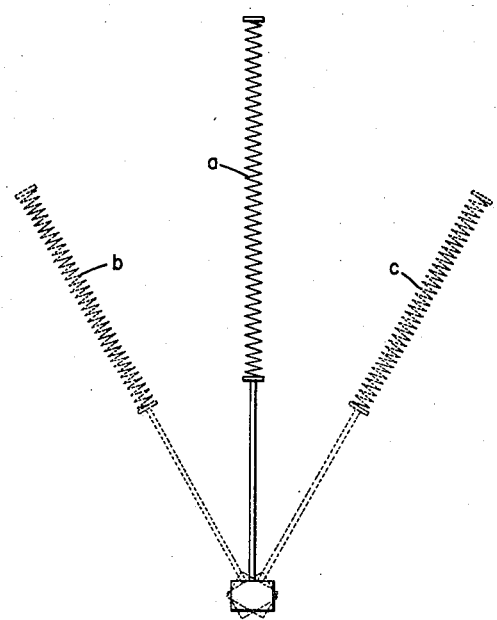
FIG. 4 is a schematic representation of the angular librations of a gravity stabilized satellite showing the contraction of the damping spring whereby the energy of the librations is absorbed.

FIG. 4 is a schematic representation showing the method by which the spring absorbs libration energy and damps out the libration about the gravity stabilized axis. In position $a$, the spring is fully extended under the existing conditions, but as it swings to position $b$, it contracts thereby absorbing some energy. As the satellite begins to move to position $c$, it passes again through position $a$, where the spring is again extended under the gravity gradient forces, absorbing an additional amount of energy and the satellite, continuing on to position $c$, absorbs further libration energy by means of the spring contracting again. By this repetitive process, all the libration energy is absorbed and the satellite gradually becomes oriented, having one side always facing the earth.

Obviously, many modifications and variations of the present invention are possible in the light of the above teachings. It is therefore to be understood that within the scope of the appended claims the invention may be practiced otherwise than as specifically described.

What is claimed is:

1. In an earth satellite containing means for eliminating angular rotation of the satellite body about its long axis in space, and magnetic means within the satellite for effecting a particular orientation of the satellite with the earth's magnetic field, the improvement comprising, an extensible boom projecting from said satellite, and a weight attached to said boom, said boom and said weight cooperating to gravity orient said satellite during said particular magnetic orientation.

2. In an earth satellite containing permeable magnetic rods for effecting despin of said satellite in space, magnetic means for orienting the satellite in a particular attitude with respect to the earth, the improvement comprising, an extensible boom projecting from said satellite, a weight attached to the end of the boom, and libration absorption means attached to said weight for damping out satellite librations about the gravity stabilized axis.

3. An earth satellite as defined in claim 2, wherein said libration absorption means comprises, a spring attached to said weight, and a second weight attached to the end of said spring.

4. In an earth satellite containing means for eliminating angular rotation of the satellite body in space, magnetic means within the satellite for effecting a first, temporary, orientation of the satellite with the earth's magnetic field, the improvement comprising, an extensible boom projecting from said satellite, a spring mount attached to said boom for increasing the transverse moment of inertia of said satellite,
a coiled spring attached to said mount, and
a weight attached to the end of said spring, said spring and said weight damping out satellite librations about the gravity stabilized axis.

5. The method of controlling the attitude of a satellite to maintain one of its surfaces always facing the earth, comprising the steps of
despinning a rotating orbiting satellite,
temporarily aligning the satellite with the earth's magnetic field, and
projecting a mass a sufficient distance from said satellite to increase the transverse moment of inertia of said satellite, whereby the satellite is gravitationally oriented.

6. In a satellite, a device for gravity stabilizing said satellite in a predetermined attitude, comprising
an extensible boom projecting from the satellite,
a weight mounted on said boom, and
a coiled spring having one end affixed to said weight and the other end affixed to said boom whereby the movement of said weight causes said spring to absorb energy and damp out librations about the gravity stabilized axis.

References Cited in the file of this patent
UNITED STATES PATENTS

| | | |
|---|---|---|
| 3,031,154 | Roberson | Apr. 24, 1962 |
| 3,048,351 | Donoho | Aug. 7, 1962 |
| 3,061,239 | Rusk | Oct. 30, 1962 |